Figure 1:
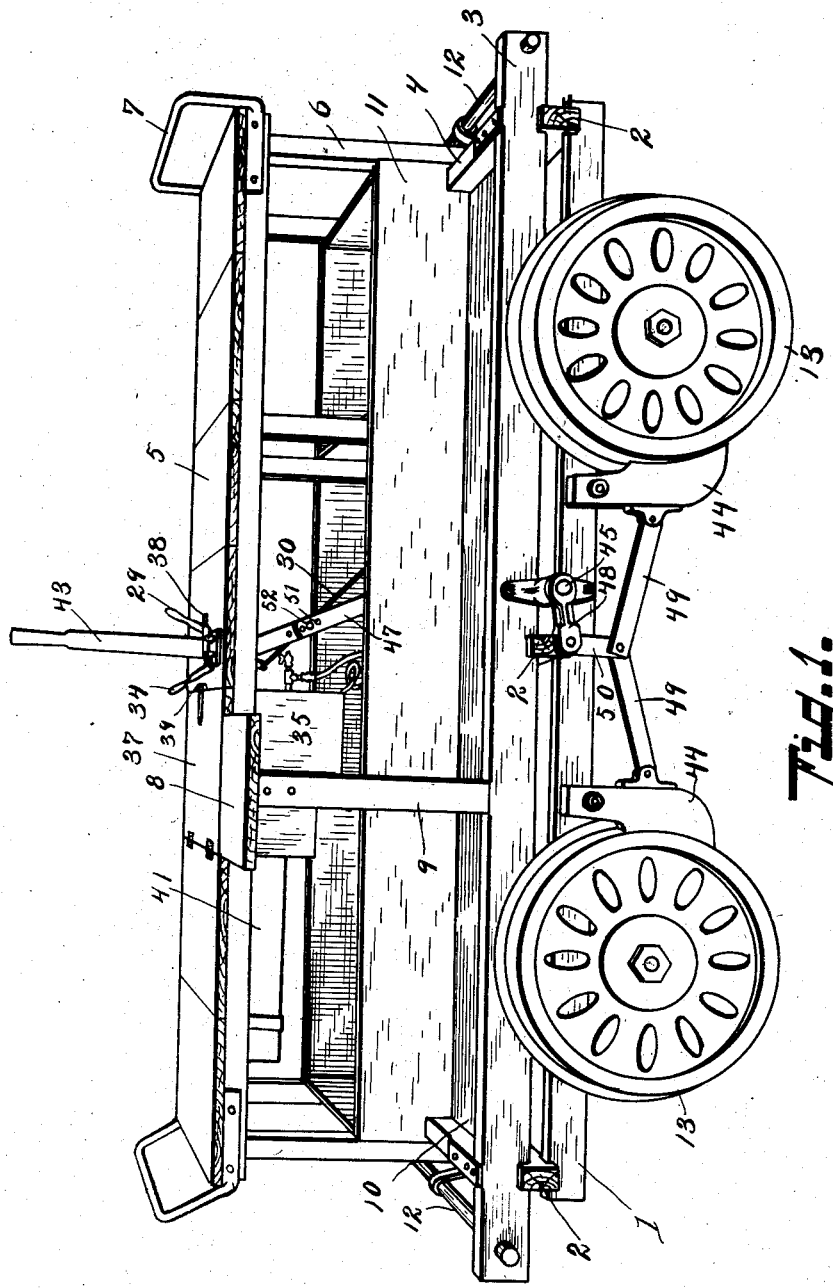

C. G. MAHANA, W. S. HOVEY & C. B. STEBBINS.
MOTOR CAR.
APPLICATION FILED JULY 22, 1909.

992,788.

Patented May 23, 1911.

4 SHEETS—SHEET 1.

Witnesses
F. Gertrude Tallman
Flora E. Braden

Inventors
Charles G. Mahana
William S. Hovey
Charles B. Stebbins
By Chappell Earl Attorneys C. G. MAHANA, W. S. HOVEY & C. B. STEBBINS.
MOTOR CAR.
APPLICATION FILED JULY 22, 1909.
992,788.
Patented May 23, 1911.
4 SHEETS—SHEET 2.
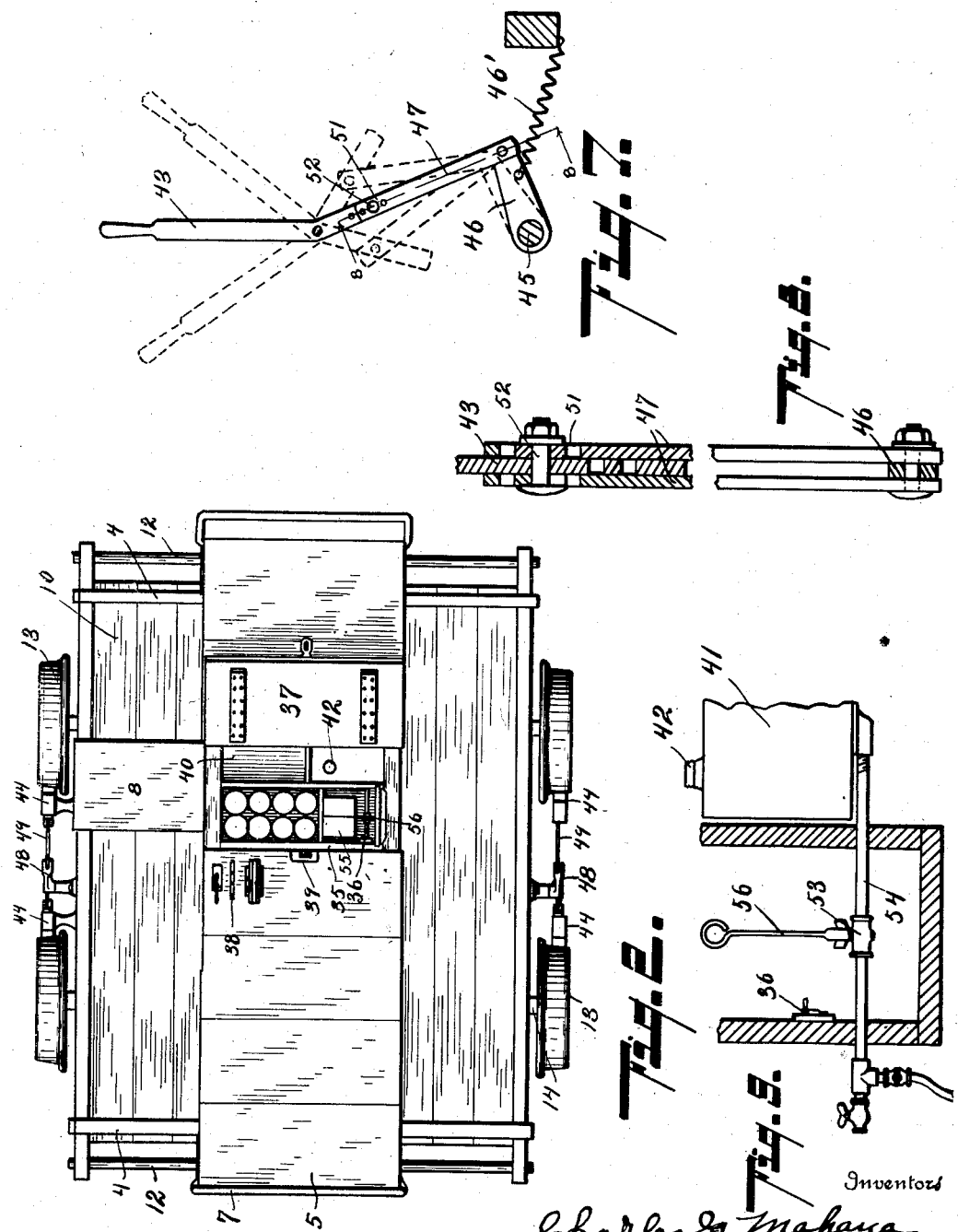

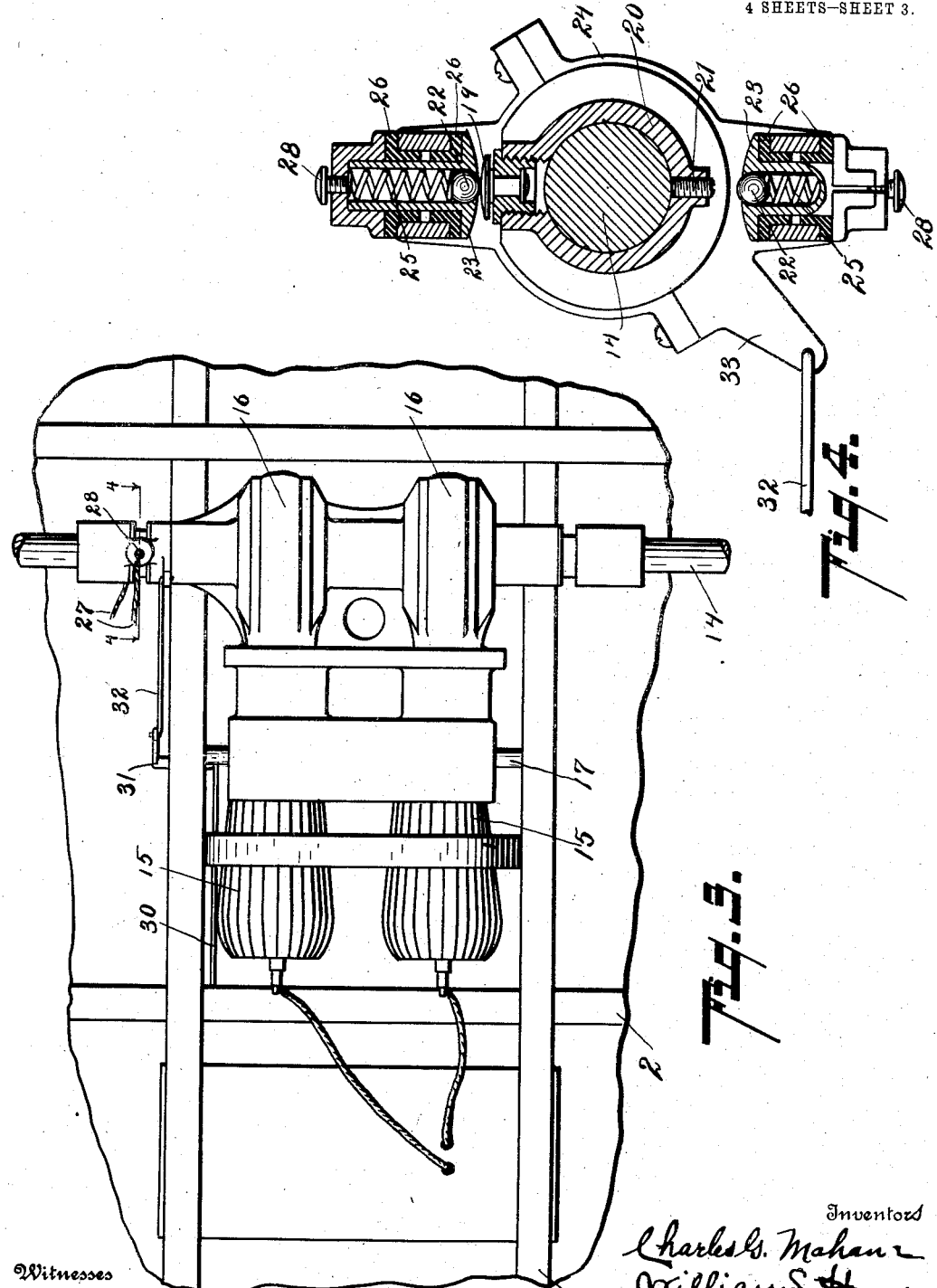

C. G. MAHANA, W. S. HOVEY & C. B. STEBBINS.
MOTOR CAR.
APPLICATION FILED JULY 22, 1909.
992,788.
Patented May 23, 1911.
4 SHEETS—SHEET 4.
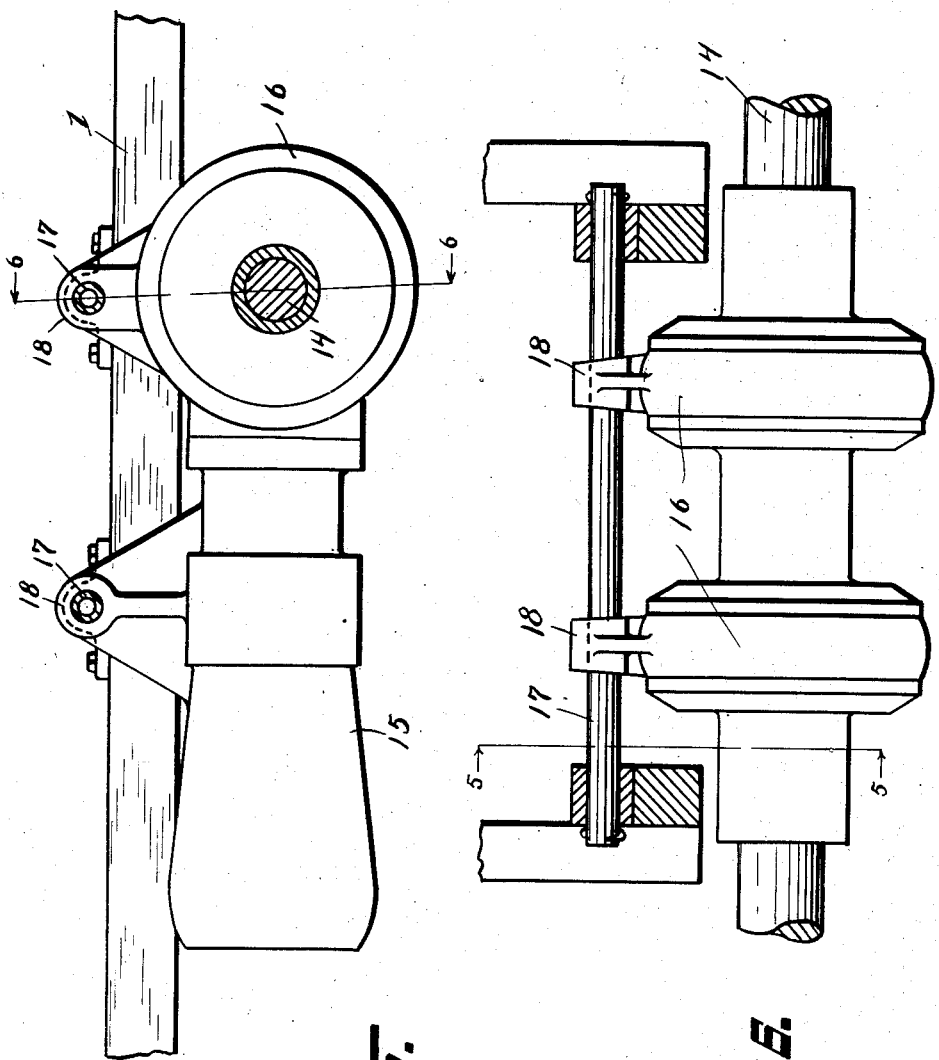

UNITED STATES PATENT OFFICE.

CHARLES G. MAHANA, WILLIAM S. HOVEY, AND CHARLES B. STEBBINS, OF THREE RIVERS, MICHIGAN, ASSIGNORS TO SHEFFIELD CAR COMPANY, OF THREE RIVERS, MICHIGAN.

MOTOR-CAR.

992,788.  Specification of Letters Patent.  Patented May 23, 1911.

Application filed July 22, 1909. Serial No. 508,932.

*To all whom it may concern:*

Be it known that we, CHARLES G. MAHANA, WILLIAM S. HOVEY, and CHARLES B. STEBBINS, citizens of the United States, residing at the city of Three Rivers, county of St. Joseph, State of Michigan, have invented certain new and useful Improvements in Motor-Cars, of which the following is a specification.

This invention relates to improvements in motor cars.

Our improvements are especially designed for and are applied by us to railway motor cars, such as is illustrated in the accompanying drawings, although certain features thereof are applicable for use in various other relations.

The main objects of our invention are: First, to provide an improved motor car which is very simple in structure and operation so that it can be operated by unskilled workmen such as the trackmen ordinarily employed on railways. Second, to provide an improved motor car which is very economical and simple in structure, and is, at the same time, effective and durable. Third, to provide an improved motor car adapted to be operated with equal facility in either direction. Fourth, to provide in a structure of the class described an improved hanger for the engine. Fifth, to provide in a structure of the class described an arrangement of parts whereby the traction wheel axle serves as a crank shaft and a timer shaft.

Further objects, and objects relating to structural details will definitely appear in the detailed description to follow.

We accomplish the objects of our invention by the devices and means described in the following specification.

The structure described constitutes one effective embodiment of our invention. Other embodiments would be readily devised by those skilled in the art.

The invention is clearly defined and pointed out in the claims.

A structure constituting an effective and preferred embodiment of the features of our invention is clearly illustrated in the accompanying drawings, forming a part of this specification, in which:

Figure 1 is a side elevation of a structure embodying the features of our invention. Fig. 2 is a plan view, the cover 37 being open. Fig. 3 is an inverted detail showing the arrangement of the engines, which are shown in conventional form. Fig. 4 is an enlarged detail section, taken on a line corresponding to line 4—4 of Fig. 3, showing details of the timer. Fig. 5 is an enlarged detail vertical section, taken on a line corresponding to line 5—5 of Fig. 6, showing the arrangement of the engines and the hangers therefor. Fig. 6 is a detail view, partially in vertical section, on a line 6—6 of Fig. 5. Fig. 7 is a detail view, showing the arrangement of the actuating lever for the brakes and the connections therefor to the brake actuating rock shaft, the movement of the parts being indicated by dotted lines. Fig. 8 is an enlarged detail section, taken on a line corresponding to line 8—8 of Fig. 7. Fig. 9 is a detail vertical section showing the arrangement of the cut-off switch and fuel cut-off.

In the drawings, similar reference characters refer to similar parts throughout the several views, and the sectional views are taken looking in the direction of the little arrows at the ends of the section lines.

Referring to the drawing, the car illustrated is especially designed as a work car for track repair men. The body of the car preferably consists of suitable longitudinal sills 1 and cross sills 2. Resting on the cross sills 2 are body side pieces 3, at the ends of which are transverse pieces 4. The seat 5 is arranged longitudinally of the car so that the occupants may sit on either side, sidewise of the car.

The seat is supported by the standards 6 secured to the body frame. At each end of the seat is a rail 7. An operator's seat 8 is preferably provided the same being arranged at one side of the main seat 5 so that the operator can sit facing in either direction according to the running of the car. This seat is located in convenient relation to the operating levers. The inner end of the seat 8 is supported on the seat while its outer end is supported by the standard 9.

On either side of the main seat is a platform 10. The frame pieces 3 and 4 of the body are arranged to form a rail about these platforms, so that the platforms serve as suitable receptacles for the tools of the workmen. The pieces 11 are secured to the standards 6, which pieces serve to brace the seat and the car body, and also form the inner walls of the platforms. At either end the car is preferably provided with hand rods 12 for convenience in lifting the car to and from the track.

The wheels 13 are mounted on axles, as 14, the bearings for the axles not being here illustrated. One of the axles is 15. A pair of engines of the two cycle type is provided in the structure, the same being, as stated, directly connected to the axle which serves as a crank shaft therefor. The details of these engines are not here illustrated.

Crank casings 16 are provided, the same being connected to the engines so as to inclose the ends of the cylinders thereof. These crank casings are mounted on the axle. The structural details of the casings are not here illustrated as such details form no part of the present invention.

The engines are preferably supported so that they may have a slight lateral movement with the axle. This is preferably accomplished by providing a pair of hanger rods 17, with which the hangers 18 of the cylinders and crank case are slidably engaged,—see Figs. 5 and 6. This permits the connecting of the engines directly to the axle,—that is, the adaptation of the axle as a crank shaft, and the parts are relieved of any strain arising from the thrust on the axle. The axle is also adapted to serve as a shaft for the timer, which is mounted thereon at one side of the crank casing,—see Figs. 3 and 4. This timer preferably consists of a contact member 19, which is mounted upon the shaft, preferably by means of the collar 20, which is secured to the shaft, as by means of the set screw 21, so that it revolves therewith.

The co-acting contact members are preferably in the form of contact balls 22, arranged in holders 23, which holders are mounted in a body portion or support 24 adjustably mounted on the axle so that they can be adjusted thereon to regulate the timing of the spark. The contact balls 22 are held yieldingly in their engaging position by the springs 25. The holders 23 are insulated by the sleeves 26. See Fig. 4. The circuit wires 27 are connected to the timer by the binding posts 28. The body portions or support 24 is adjusted through the hand lever 29. This lever is connected by the link 30 to an arm of the double armed rock shaft 31, the other arm of the rock shaft being connected by the link 32 to the arm 33 on the timer body 24. By this arrangement of the parts, the support may be adjusted, as stated, to properly time the sparking. As the engines are of the two-cycle type they will drive the car in the direction in which they are started to rotate. The timing of the spark is effected by shifting the actuating lever in the corresponding direction relative to the direction of movement of the car to accomplish the same results.

The engine throttle lever 34 is arranged in convenient position to be manipulated by the driver when occupying the seat 8. The details of the connection of this throttle lever are not here illustrated, as they form no part of the present invention.

To protect battery and coil and to prevent tampering with or unauthorized use of the car, we preferably provide a box 35 in which the battery and coil are arranged, see Figs. 1 and 9. The box 35 is preferably arranged under the seat and is preferably provided with compartments for the battery, a tool box 40 and a compartment into which the fuel tank 41 projects. The box is provided with a cover 37 and a lock 39. Within the box is a cut-off switch 36 for the battery which can be manipulated only when the cover 37 is open. A cut-off valve 53 is provided for the fuel feed pipe 54, the cut-off valve 53 being located within the box. The compartment in which the battery 55 is located is preferably provided with a removable end 56 which can be removed only when the door is open. This removable end 56 is provided as a matter of convenience in making the connections to the coil. The connections for the feed pipe 54 to the carbureter are not shown herein.

The operating switch 38 is arranged to be manipulated from the seat 8. The details of these switches, are, however, not illustrated as they form no part of the present invention.

When the car is left standing at the roadside, as section or work cars of this type frequently are, the switch 36 may be opened, the cut-off 53 closed and the cover 37 locked. It is then impossible for any one to put anything into the gasolene tank, the closure 42 thereof being under the cover, or to draw the fuel therefrom, and it is also impossible to turn on the electric current, or to get access to the battery coil, or tools.

The car is preferably provided with a brake adapted to be actuated from an actuating lever 43 when the same is shifted in either direction from its normal or inoperative position, so that the brake mechanism can be actuated by the same relative movement of the lever when the car is moving in either direction, thus avoiding any likelihood of accident on account of the confusion of the driver resulting from a change in the direction of movement of the car.

The lever 43 is connected to the brake shoes 44 through the rock shaft 45, which is provided with an arm 46 to which the lever 43 is connected through a link 47, and with an arm 48 which is connected to the brake shoes by the links 49 and 50. The links 49 are pivoted to the brake shoes and arranged in oppositely disposed pairs. The link 50 is connected to the arm 48 and to the links 49, thereby making a toggle connection for the rock shaft to the brake shoes and simultaneously actuating the pair of brake shoes. The link 47 is preferably adjustably connected to the lever 43 by providing a plurality of holes 51 for the connecting bolt 52. A spring 53 is preferably provided for returning the parts to their initial or inoperative position.

Our improved motor car is very simple and economical in structure and is, at the same time, very efficient and satisfactory in use. The car can be driven in either direction with equal facility without the necessity for especial adjustment.

We have illustrated and described our improved car in the form which we have embodied it in practice. We are, however, aware that it can be considerably varied in structural details without departing from our invention, and we desire to be understood as not only claiming the structure illustrated in its specific form, but also claiming the invention broadly within the scope of the appended claims.

Having thus described our invention, what we claim as new and desire to secure by Letters Patent is:

1. In a motor car, the combination with the car body, of traction wheels; a plurality of two-cycle engines comprising suitable cylinders; an axle for said traction wheels arranged as a crank shaft for said engines; crank casing mounted on said axle, said crank casing being connected to the cylinders of the engines; hanger rods arranged parallel with said axle; hangers slidably mounted upon said hanger rods; a timer comprising a body portion adjustably mounted upon said axle at one side of said crank casing; a contact member carried on said axle; and means for adjusting said body on said axle whereby the timing is secured.

2. In a motor car, the combination with the car body, of traction wheels; a plurality of two-cycle engines comprising suitable cylinders; an axle for said traction wheels arranged as a crank shaft for said engines; crank casing mounted on said axle, said crank casing being connected to the cylinders of the engines; hanger rods arranged parallel with said axle; and hangers slidably mounted upon said hanger rods.

3. In a motor car, the combination with the car body, of traction wheels; a plurality of two-cycle engines comprising suitable cylinders; an axle for said traction wheels arranged as a crank shaft for said engines; crank casing mounted on said axle, said crank casing being connected to the cylinders of the engines, said engines being supported to permit their lateral movement; a timer comprising a body portion adjustably mounted upon said axle at one side of said crank casing; a contact member carried by said body; a contact member on said axle; and means for adjusting said body on said axle whereby the timing is secured.

4. In a motor car, the combination with the car body, of traction wheels; a plurality of two-cycle engines comprising suitable cylinders; an axle for said traction wheels arranged as a crank shaft for said engines; and crank casing mounted on said axle, said crank casing being connected to the cylinders of the engines, said engines being supported to permit their lateral movement.

5. In a motor car, the combination with the car body, of traction wheels; a plurality of two-cycle engines comprising suitable cylinders; an axle for said traction wheels arranged as a crank shaft for said engines; crank casing mounted on said axle, said crank casing being connected to the cylinders of the engines; a hanger for said engines whereby they are supported to permit their lateral movement; a timer comprising a body portion adjustably mounted upon said axle at one side of said crank casing; a contact member carried by said body; a contact member on said axle; and means for adjusting said body on said axle whereby the timing is secured.

6. In a motor car, the combination with the car body, of traction wheels; a plurality of two-cycle engines comprising suitable cylinders; an axle for said traction wheels arranged as a crank shaft for said engines; crank casing mounted on said axle, said crank casing being connected to the cylinders of the engines; and a hanger for said engines whereby they are supported to permit their lateral movement.

7. In a motor car, the combination with the car body, of traction wheels; a plurality of two-cycle engines comprising suitable cylinders; an axle for said traction wheels arranged as a crank shaft for said engines; crank casing mounted on said axle, said crank casing being connected to the cylinder of the engines; a hanger for said engines whereby they are supported to permit their lateral movement; and a timer, the said axle being the shaft of said timer.

8. In a motor car, the combination with the car body, of traction wheels; a plurality of two-cycle engines comprising suitable cylinders; an axle for said traction wheels arranged as a crank shaft for said engines; crank casing mounted on said axle, said crank casing being connected to the cylinders of the engines, said engines being supported to permit their lateral movement; and a timer, the said axle being the shaft of said timer.

9. In a motor car, the combination with the car body, of traction wheels; an engine;

an axle for said traction wheels adapted as a crank shaft for said engine, said engine being supported to permit its lateral movement; a timer comprising a body portion adjustably mounted upon said axle; contact members carried by said body; a contact on said axle; and means for adjusting said body on said axle.

10. In a motor car, the combination with the car body, of traction wheels; an engine; an axle for said traction wheels adapted as a crank shaft for said engine, said engine being supported to permit its lateral movement; and a timer, the said axle being the shaft of said timer.

11. In a motor car, the combination with the car body, of traction wheels; an engine; an axle for said traction wheels arranged as a crank shaft for said engine; a crank casing mounted on said axle, said crank casing mounted on said axle, said crank casing being connected to the cylinder of the engine; hanger rods arranged parallel of said axle; hangers slidably mounted upon said hanger rods; and a timer, the said axle being the shaft of said timer.

12. In a motor car, the combination with the car body of traction wheels; an engine; an axle for said traction wheels arranged as a crank shaft for said engine; a crank casing mounted on said axle, said crank casing being connected to the cylinder of the engine; hanger rods arranged parallel of said axle; and hangers slidably mounted upon said hanger rods.

13. In a motor car, the combination with the car body of traction wheels; an engine; an axle for said traction wheels arranged as a crank shaft for said engine; a crank casing mounted on said axle, said crank casing being connected to the cylinder of the engine; a hanger for said engine adapted to permit lateral movement thereof; and a timer, the said axle being the shaft of said timer.

14. In a motor car, the combination with the car body, of traction wheels; an engine; an axle for said traction wheels arranged as a crank shaft for said engine; hanger rods arranged parallel to said axle; hangers slidably mounted upon said hanger rods; and a timer, the said axle being the shaft of said timer.

15. In a motor car, the combination with the car body, of traction wheels; an engine; an axle for said traction wheels arranged as a crank shaft for said engine; hanger rods arranged parallel of said axle; and hangers slidably mounted upon said hanger rods.

16. In a motor car, the combination with the car body, of traction wheels; an engine; an axle for said traction wheels arranged as a crank shaft for said engine; a hanger for said engine adapted to permit lateral movement thereof; and a timer, the said axle being the shaft of said timer.

17. In a motor car, the combination with the car body, of traction wheels; an engine; an axle for said traction wheels arranged as a crank shaft for said engine; a crank casing mounted on said axle, said crank casing being connected to the cylinder of the engine; and a hanger for said engine adapted to permit the lateral movement thereof.

18. In a motor car, the combination with the car body, of traction wheels; an engine; an axle for said traction wheels arranged as a crank shaft for said engine; and a hanger for said engine adapted to permit the lateral movement thereof.

In witness whereof, we have hereunto set our hands and seals in the presence of two witnesses.

CHARLES G. MAHANA. [L. S.]
WILLIAM S. HOVEY. [L. S.]
CHARLES B. STEBBINS. [L. S.]

Witnesses:
ORLEY R. BAIRD,
ADRIAN J. NEERKEN.